United States Patent
Rodecker

(10) Patent No.: US 10,718,253 B2
(45) Date of Patent: Jul. 21, 2020

(54) EXHAUST SYSTEM ISOLATOR MOUNT WITH ANTI-ROTATION FEATURE

(71) Applicant: The Pullman Company, Milan, OH (US)

(72) Inventor: Troy P. Rodecker, Berlin Heights, OH (US)

(73) Assignee: The Pullman Company, Milan, OH (US)

( * ) Notice: Subject to any disclaimer, the term of this patent is extended or adjusted under 35 U.S.C. 154(b) by 30 days.

(21) Appl. No.: 16/103,154

(22) Filed: Aug. 14, 2018

(65) Prior Publication Data

US 2020/0056531 A1 Feb. 20, 2020

(51) Int. Cl.
| | |
|---|---|
| *F01N 13/18* | (2010.01) |
| *F16F 1/38* | (2006.01) |
| *F16L 55/033* | (2006.01) |
| *F16F 1/36* | (2006.01) |
| *F16L 55/035* | (2006.01) |

(52) U.S. Cl.
CPC ........ *F01N 13/1822* (2013.01); *F16F 1/3842* (2013.01); *F16F 1/36* (2013.01); *F16F 1/38* (2013.01); *F16L 55/035* (2013.01)

(58) Field of Classification Search
CPC .... F16F 1/36; F16F 1/38; F16F 1/3842; F16F 1/3849; F16L 55/035; F01N 13/1805; F01N 13/1811; F01N 13/1822; B60K 5/12; B60K 5/1208; B60K 5/1225; B60K 13/04

See application file for complete search history.

(56) References Cited

U.S. PATENT DOCUMENTS

| | | | |
|---|---|---|---|
| 2,227,306 A | 12/1940 | Guy | |
| 2,925,972 A | 2/1960 | Sullivan | |
| 2,925,973 A | 2/1960 | Aebersold | |
| 5,398,907 A | 3/1995 | Kelchner | |
| 7,207,583 B2 * | 4/2007 | Ross | B60G 7/02 267/270 |
| 9,650,939 B2 | 5/2017 | Rodecker | |
| 9,689,521 B2 | 6/2017 | Noll et al. | |
| 10,030,569 B2 | 7/2018 | Rodecker | |
| 10,087,811 B2 * | 10/2018 | Walther | F01N 13/1822 |

(Continued)

FOREIGN PATENT DOCUMENTS

| | | | |
|---|---|---|---|
| DE | 4125680 C2 * | 4/1995 | B60K 13/04 |
| FR | 3019213 A1 * | 10/2015 | F01N 13/1822 |
| JP | 2013047017 A | 3/2013 | |

*Primary Examiner* — Thomas J Williams
(74) *Attorney, Agent, or Firm* — Donald G. Walker

(57) ABSTRACT

An isolator mount for supporting an exhaust component on a vehicle body via a hanger. The isolator mount includes an isolator element, isolator bracket, and clevis bracket. The isolator element has an aperture for receiving a portion of the hanger and dampens vibrations. The isolator bracket extends at least partially about and supports the isolator element and further includes a neck portion. The clevis bracket has a first half and a second half that are secured to the neck portion of the isolator bracket with a fastener that extends along a longitudinal axis. The first half of the clevis bracket and the neck portion of the isolator bracket include an anti-rotation feature in the form of a key-way slot and a key that is received in the key-way slot to prevent rotation of the isolator bracket relative to the clevis bracket about the longitudinal axis of the fastener.

19 Claims, 16 Drawing Sheets

(56) References Cited

U.S. PATENT DOCUMENTS

| | | |
|---|---|---|
| 2003/0155169 A1 | 8/2003 | Kromis et al. |
| 2003/0160136 A1 | 8/2003 | Kato |
| 2004/0262460 A1 | 12/2004 | Molnar et al. |
| 2005/0184201 A1 | 8/2005 | Komitsu et al. |
| 2011/0115258 A1* | 5/2011 | Ohhama ................ B62D 21/11 |
| | | 296/193.07 |
| 2012/0091639 A1 | 4/2012 | Lee et al. |
| 2012/0292478 A1 | 11/2012 | Uhlenbruch |
| 2013/0075965 A1 | 3/2013 | Rodecker |
| 2014/0259565 A1* | 9/2014 | Hirama ................... F16L 3/223 |
| | | 24/455 |

\* cited by examiner

EXHAUST SYSTEM ISOLATOR MOUNT WITH ANTI-ROTATION FEATURE

FIELD

The present disclosure relates to isolator mounts for motor vehicle exhaust systems, and more particularly to isolator mounts that reduce or eliminate the need for multiple hangers.

BACKGROUND

The statements in this section merely provide background information related to the present disclosure and may not constitute prior art.

Many configurations of hanger devices have been developed for mounting and orienting an isolator, used to support an exhaust component of a motor vehicle while isolating the vehicle body from vibrations of the exhaust component and vice versa. Traditionally, single hole isolators were mounted to a sufficiently stiff and rigid portion of the vehicle body through the use of a hanger, as shown in FIG. 1. Typically, such isolators include an isolator support bracket that is bolted or welded to the vehicle body. A rubber isolator element is mounted in the isolator support bracket to dampen vibrations. A separate hanger, typically welded to the exhaust component, has a distal end that is received in a hole in the rubber isolator element. The length of the hanger has to be sufficiently long to provide space for the rubber isolator element to be far enough from the exhaust component so that the rubber isolator element is not damaged by heat from the exhaust component. This mounting configuration has the drawback of requiring the vehicle manufacturer to design a mounting point on the vehicle body that provides sufficient area, strength, and stiffness to accommodate the required mounting bracket and mounting bolt(s). This has proven to be challenging with some vehicles. One hole isolators can also be difficult to install during assembly of the vehicle because the rubber isolator element can move relative to the isolator support bracket during installation before the isolator is bolted or welded into place.

Other well-known forms of isolators, such as the isolator shown in FIG. 2A, require multiple hangers. Each isolator shown in FIG. 2A requires two independent hangers, one fixedly secured (e.g., by welding) to the exhaust structure and the other fixedly secured (e.g., by welding) to a body portion of the vehicle. The system of FIG. 2A thus requires a total of four independent hangers for its use. FIG. 2B shows another known hanger configuration, where a pair of hangers and a corresponding pair of brackets are required to achieve the needed degree of modal stiffness and strength to support the exhaust component.

Conventional two hole isolators lack travel control and durability compared to single hole isolator designs. Three and four hole isolator designs require multiple inefficient heavy hangers, along with the time and labor required to install the required hangers on the vehicle body itself. Three and four hole isolator designs also typically provide less than optimal durability compared to bolt-to-body designs (i.e., as shown in FIG. 1). In addition, the need for providing two or more holes in the isolator can reduce its strength and durability.

To address these problems, Tenneco Automotive Operating Company, Inc. developed the isolators described in U.S. patent application Ser. No. 14/678,377, filed on Apr. 3, 2015, and U.S. patent application Ser. No. 15/481,765, filed on Apr. 7, 2017. The isolator mount disclosed herein improves upon those designs. Accordingly, the entire disclosures of the applications listed above are incorporated herein by reference.

SUMMARY

This section provides background information related to the present disclosure and is not necessarily prior art.

The present disclosure relates to an isolator mount for supporting an exhaust component on a body portion of a vehicle via a hanger. The isolator mount includes an isolator element, an isolator bracket, and a clevis bracket. The isolator element has an aperture for receiving a portion of the hanger and dampens vibrations between the hanger and the isolator bracket. The isolator bracket extends at least partially about and supports the isolator element and further includes a neck portion. The clevis bracket has a first half and a second half. At least one of the first half and the second half of the clevis bracket is secured to the neck portion of the isolator bracket with a fastener that extends along a longitudinal axis. The first half of the clevis bracket and the neck portion of the isolator bracket include an anti-rotation feature in the form of a key-way slot and a key that is received in the key-way slot to prevent rotation of the isolator bracket relative to the clevis bracket about the longitudinal axis of the fastener. The key-way slot may be provided on the first half of the clevis bracket and the key may extend from the neck portion of the isolator bracket or vice versa.

When the exhaust component is installed during assembly of the vehicle, one or more jigs are typically used to hold the isolator mount in position relative to the exhaust component and the vehicle body until the clevis bracket is welded or bolted into place. Because the isolator mount disclosed herein includes the anti-rotation feature, the jig(s) will not have to control the pivoting of the isolator bracket relative to the clevis bracket. Advantageously, this can expedite the installation process and allows for fewer/simpler jigs to be used during vehicle assembly. The overall length of the disclosed isolator mount can also be easily tailored to accommodate large reaches between the exhaust component and the mounting point on the vehicle body.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

Figure 1:
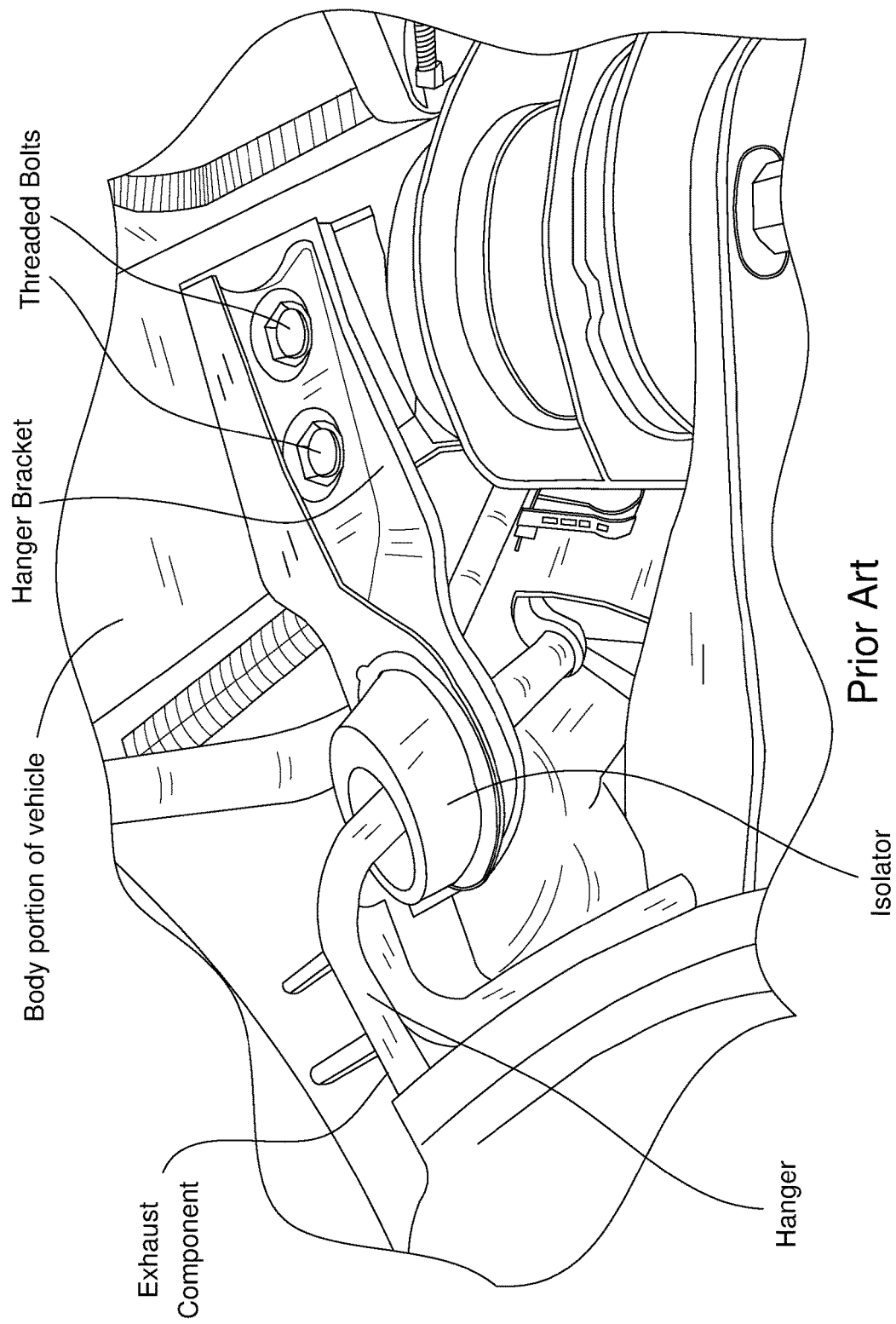
FIG. 1 is an illustration of a prior art, single hole, bolt-to-body isolator system.
Figure 2A:
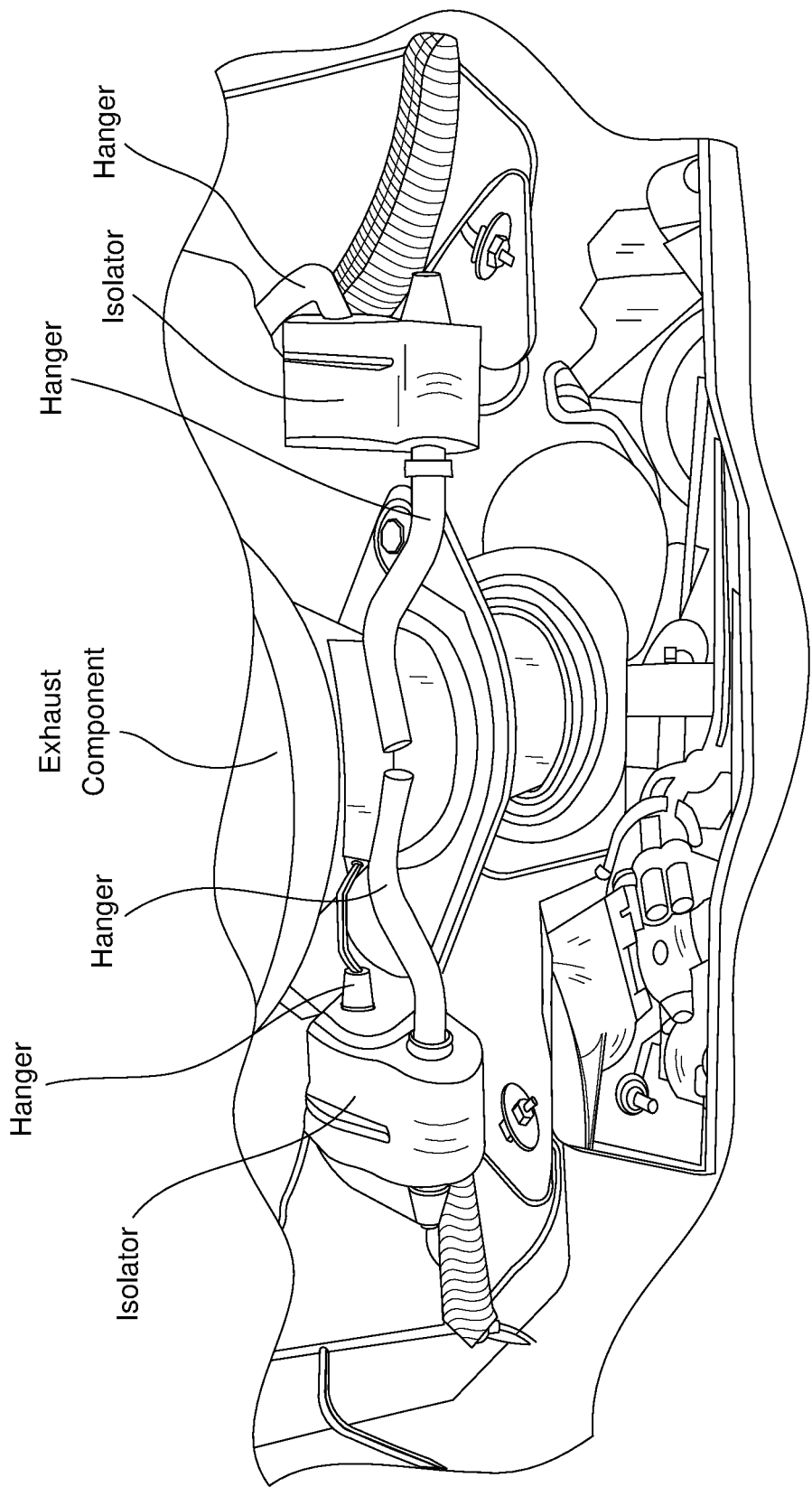
FIG. 2A is an illustration of a pair of prior art isolators which require two hangers to be used with each isolator, one hanger fixedly secured to an exhaust component and the other fixedly secured to a portion of the vehicle body.
Figure 2B:
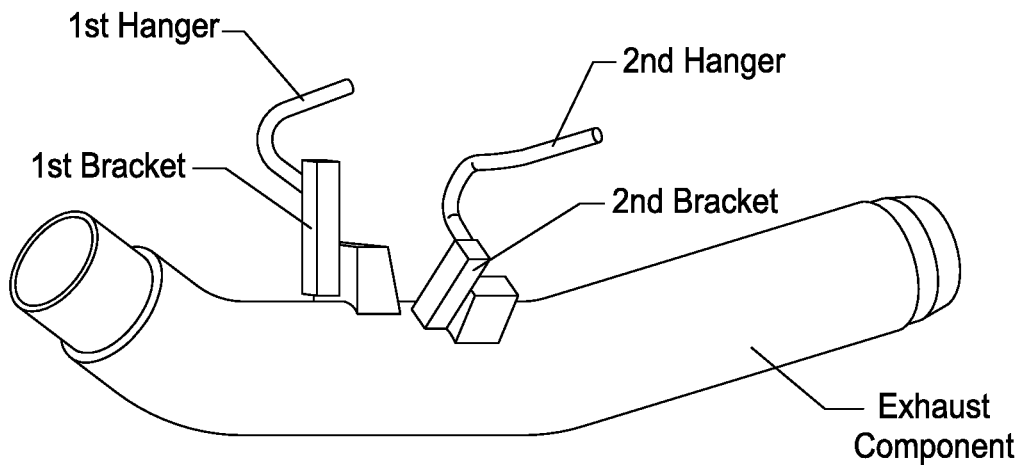
FIG. 2B is an illustration of a prior art configuration for supporting an exhaust component which requires the use of two hangers and two brackets to achieve a desired degree of modal strength, stiffness and positional tolerance, with a required long hanger reach to achieve sufficient thermal clearance for the isolator element (not shown) and/or to achieve a long reach between the exhaust component and the body mounting surface of the vehicle for packaging reasons.
Figure 3:
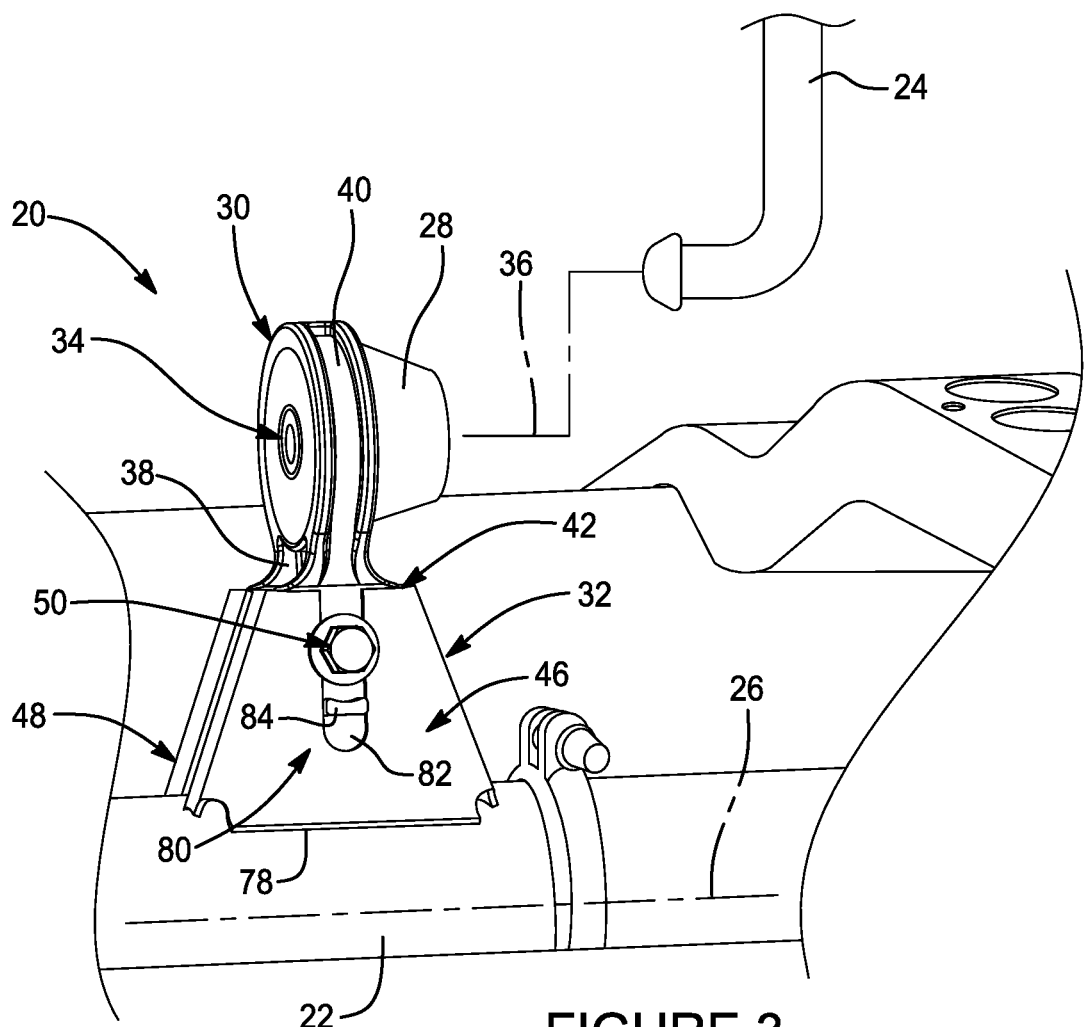
FIG. 3 is a front perspective view of an exemplary isolator mount constructed in accordance with the present disclosure that is shown installed on an exhaust component of a vehicle.
Figure 4:
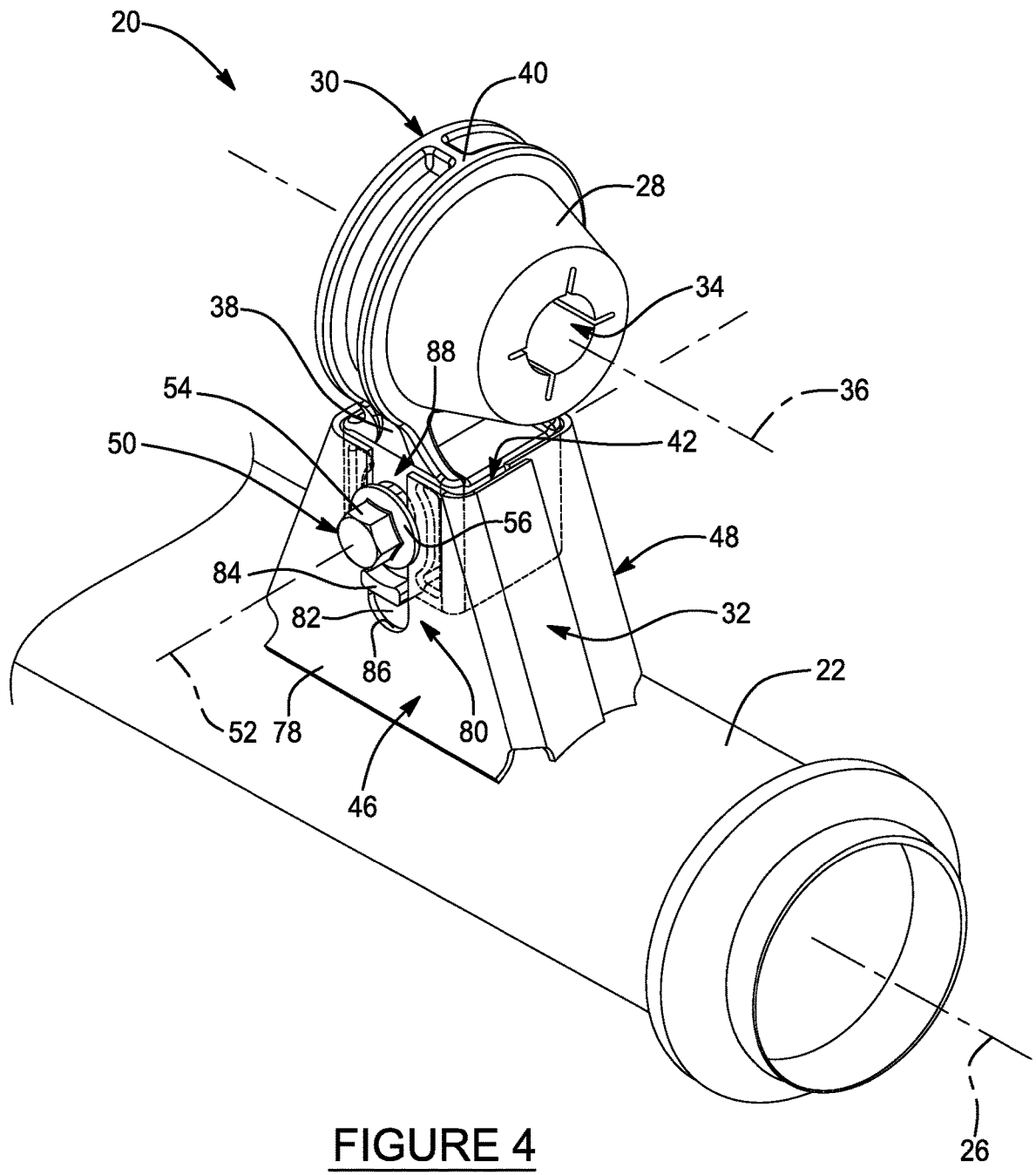
FIG. 4 is an enlarged front perspective view of the exemplary isolator mount illustrated in FIG. 3 with just a portion of the exhaust component being shown.
Figure 5:
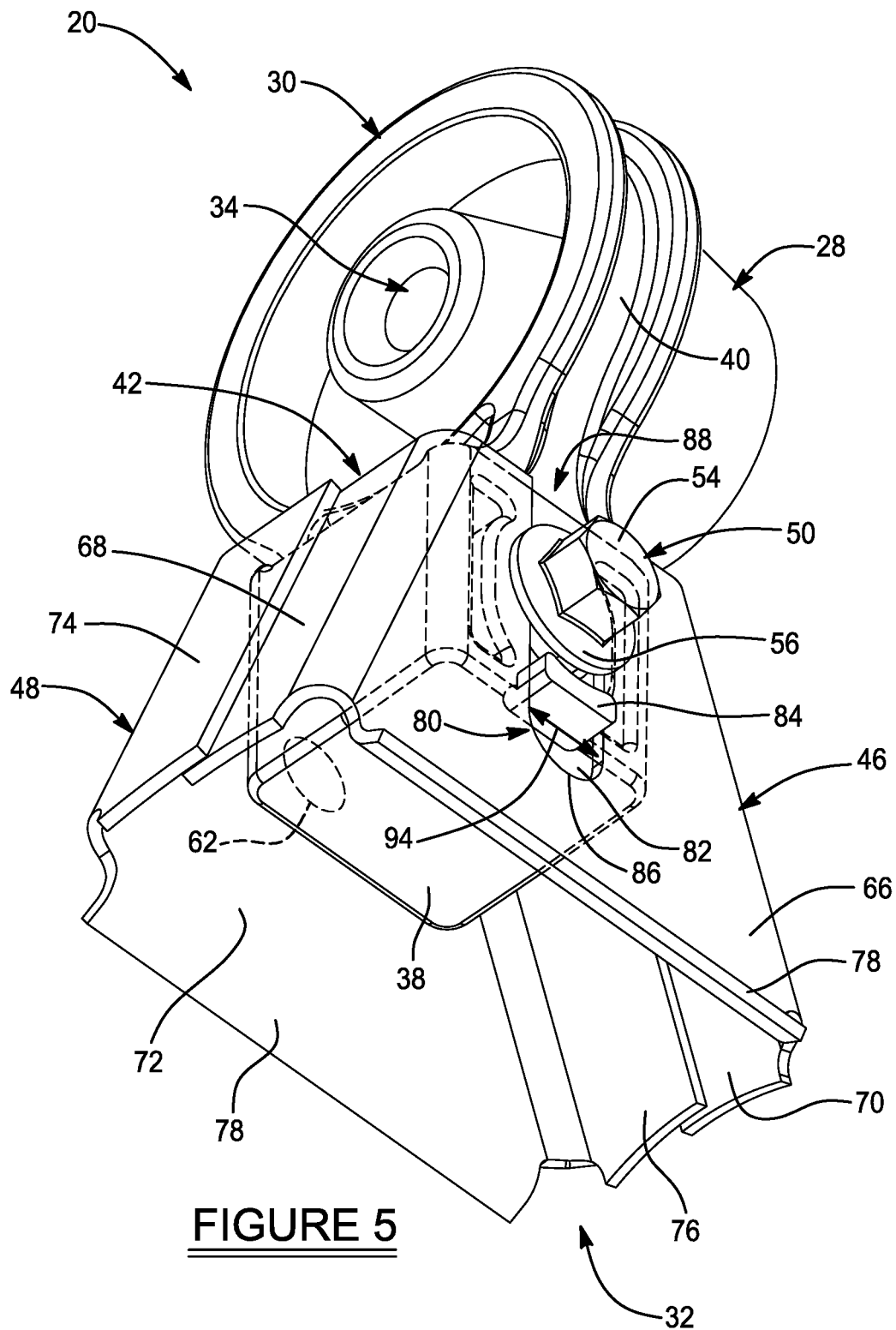
FIG. 5 is a front perspective view of the exemplary isolator mount illustrated in FIG. 3 shown detached from the exhaust component.
Figure 6:
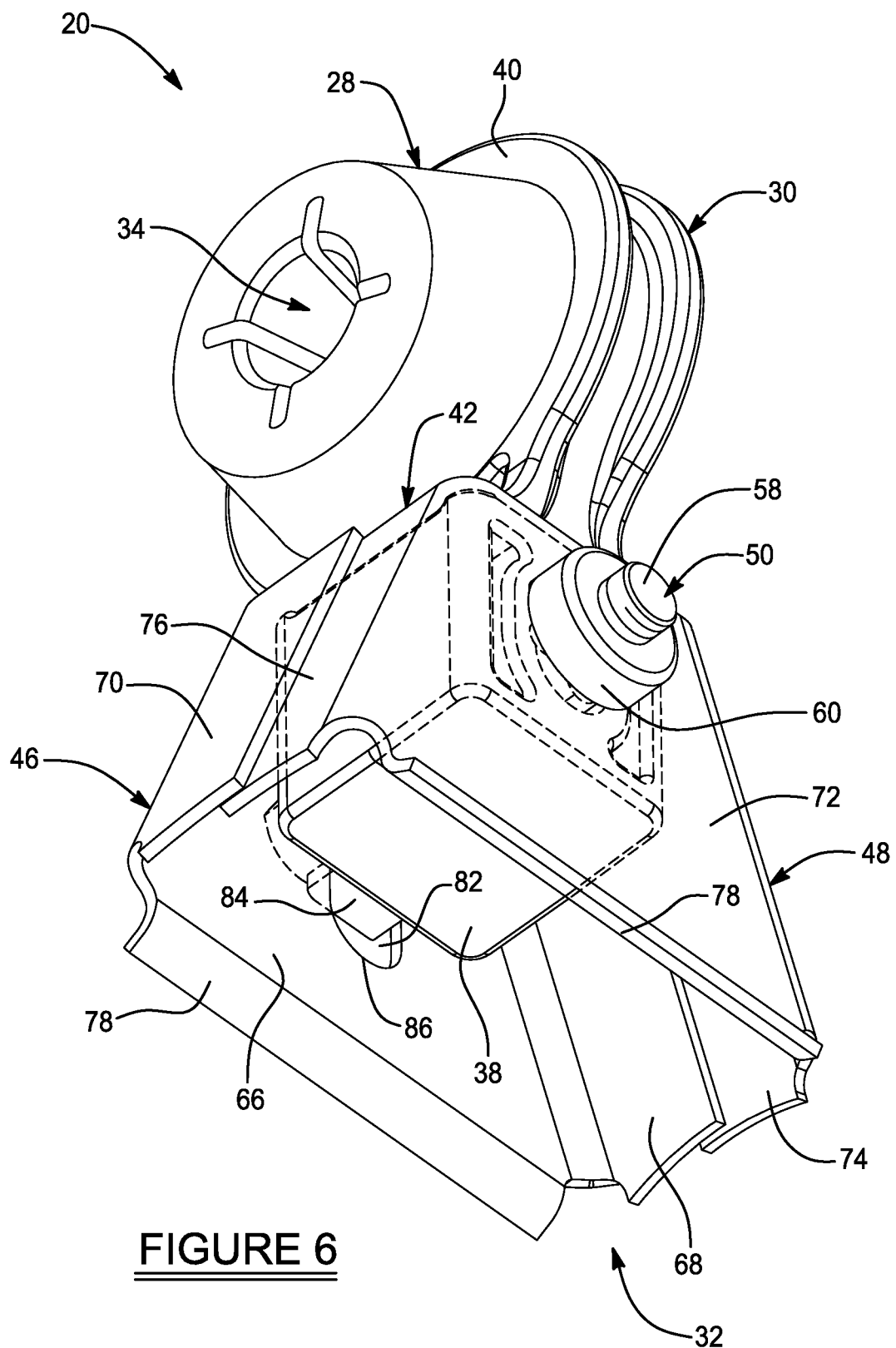
FIG. 6 is a rear perspective view of the exemplary isolator mount illustrated in FIG. 3 shown detached from the exhaust component.
Figure 7:
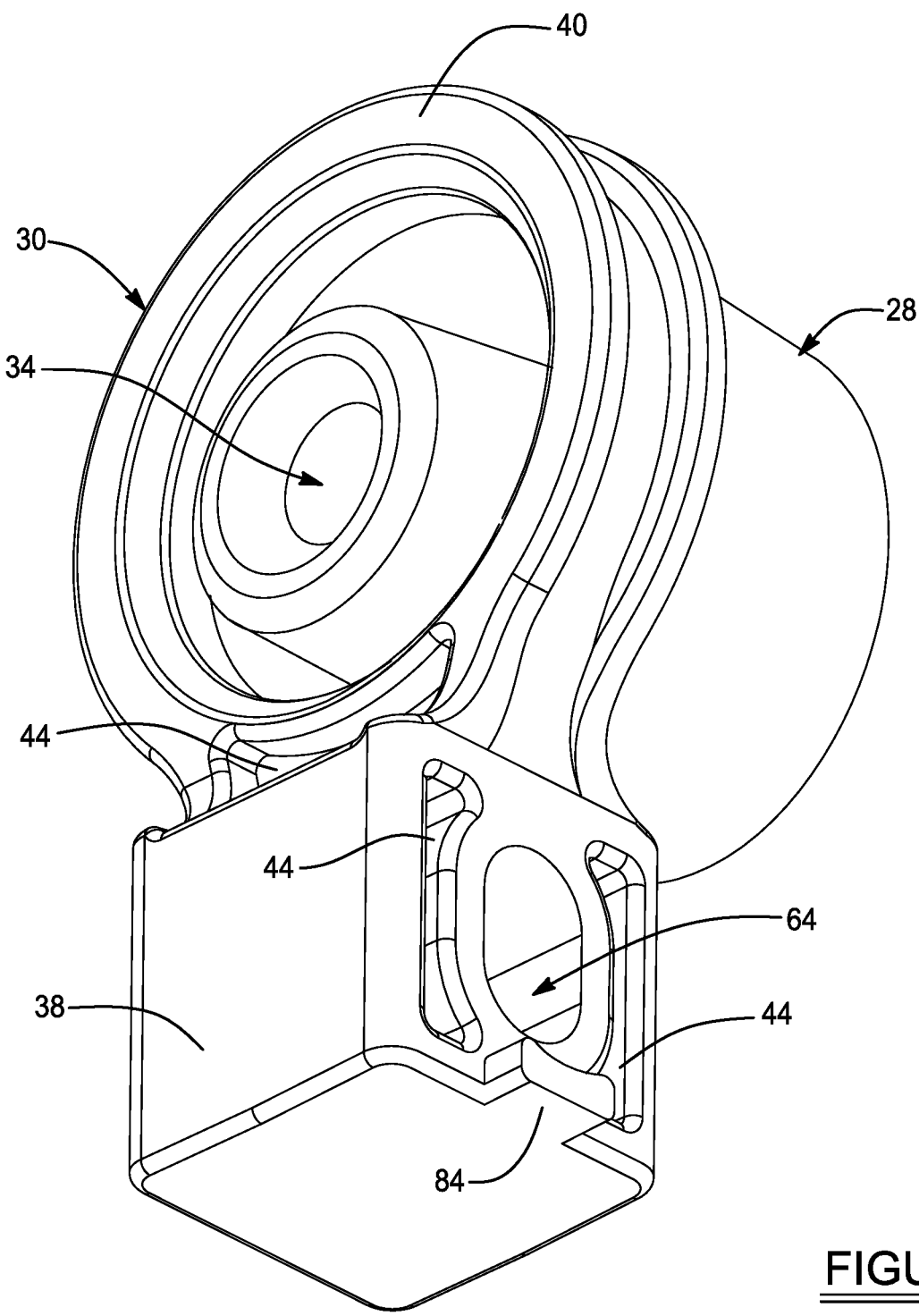
FIG. 7 is a front perspective view of an isolator bracket and an elastomeric isolator element of the exemplary isolator mount illustrated in FIG. 3.
Figure 8:
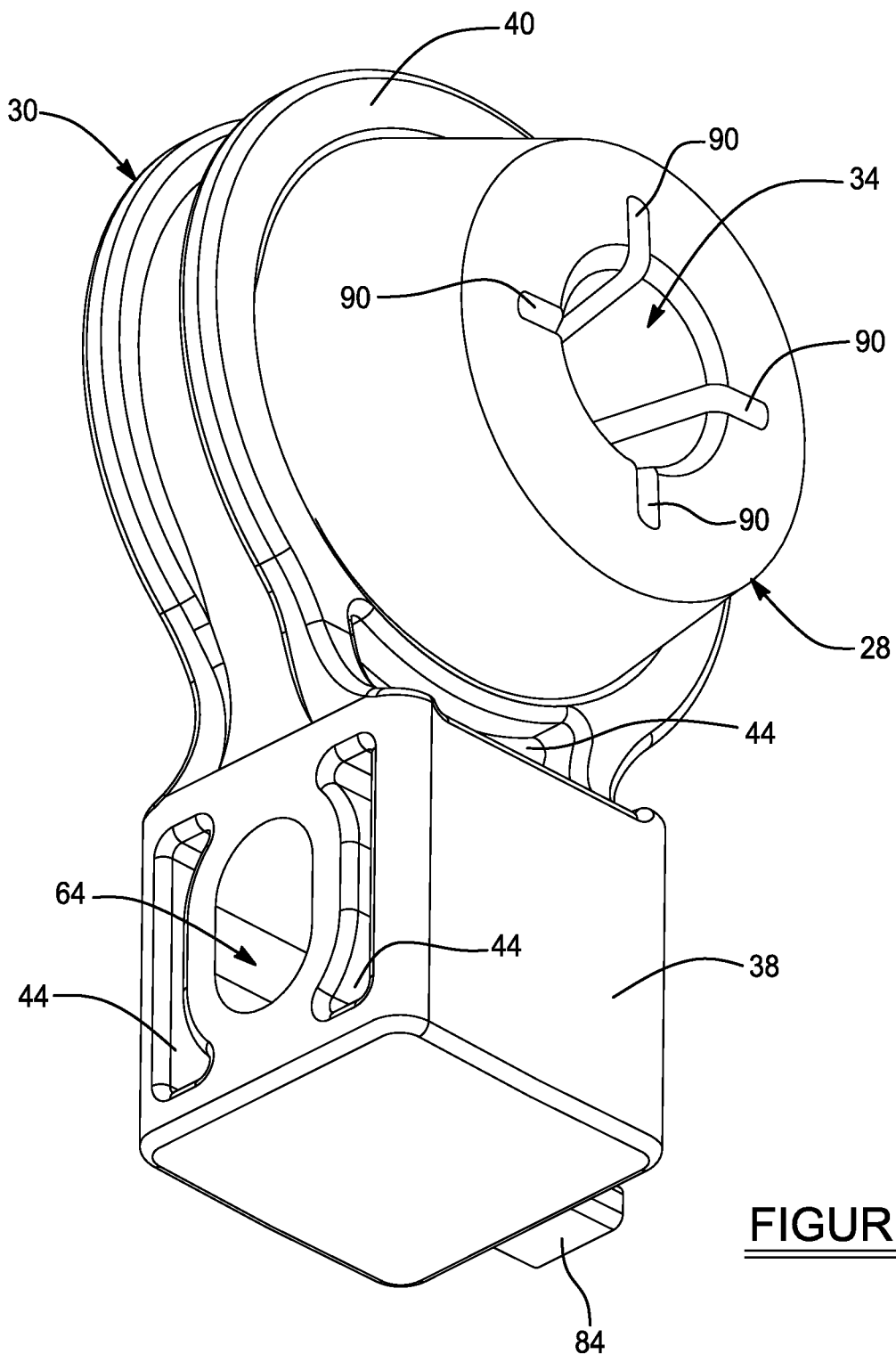
FIG. 8 is a rear perspective view of the isolator bracket and elastomeric isolator element of the exemplary isolator mount illustrated in FIG. 3.
Figure 9:
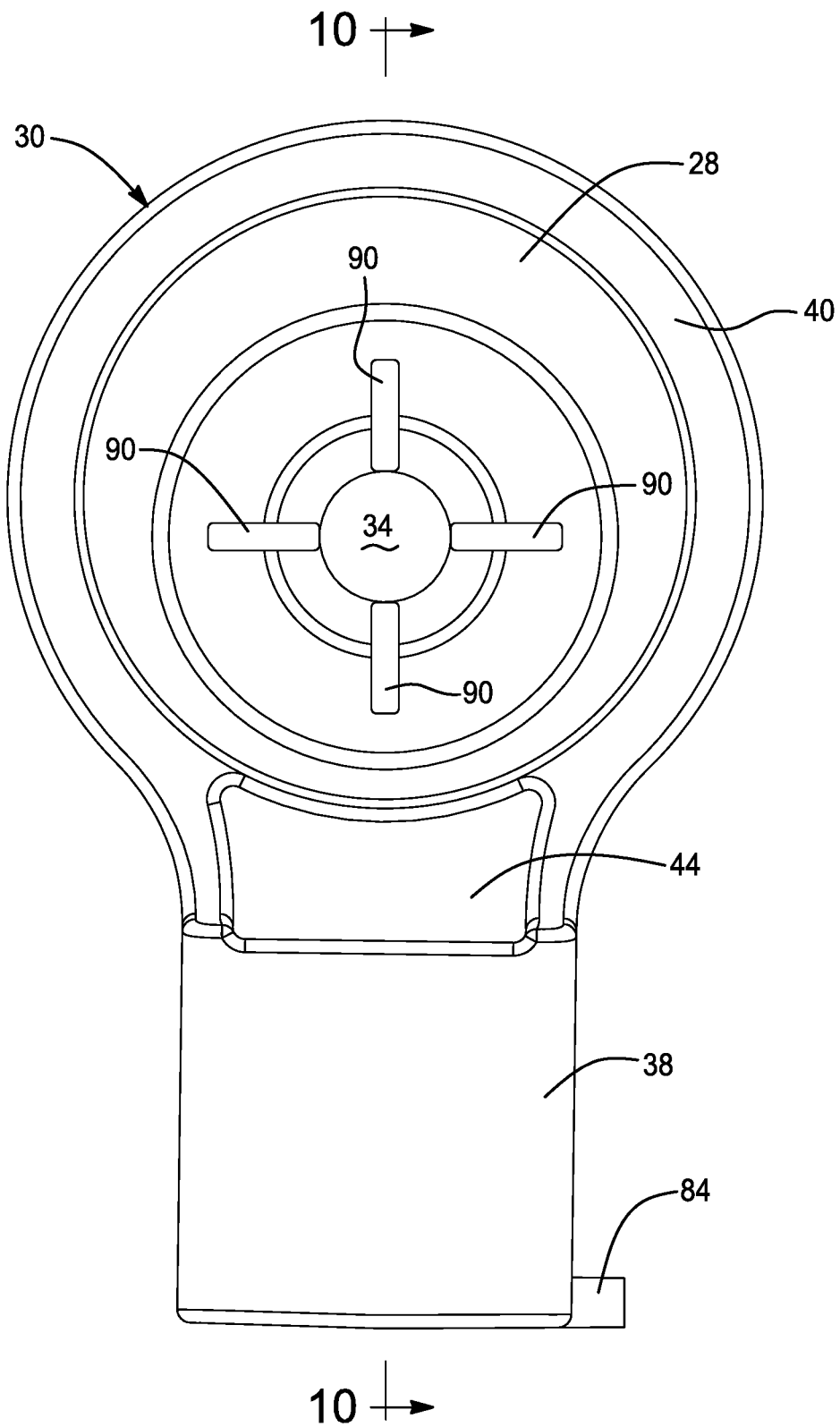
FIG. 9 is a side view of the isolator bracket and elastomeric isolator element of the exemplary isolator mount illustrated in FIG. 3.

The following description is merely exemplary in nature and is not intended to limit the present disclosure, application, or uses. It should be understood that throughout the drawings, corresponding reference numerals indicate like or corresponding parts and features.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "inside," "outside," "internal," "external," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Referring to the Figures, an isolator mount 20 for supporting an exhaust component 22 is shown. The isolator mount 20 is connected to a body portion of the vehicle (not shown) via a hanger 24. During operation of the vehicle, the exhaust component 22 carries exhaust along an exhaust flow axis 26. As such, the exhaust component 22 may be, without limitation, an exhaust pipe, muffler, header, crossover pipe, downpipe, catalytic converter or other catalyst, particulate filter, exhaust valve assembly, or other component of an exhaust system through which exhaust flows.

The isolator mount 20 includes an elastomeric isolator element 28, an isolator bracket 30, and a clevis bracket 32. The clevis bracket 32 is fixedly secured, such as by welding, to the exhaust component 22 of the vehicle. The elastomeric isolator element 28 has an aperture 34 that receives a portion of the hanger 24 when the isolator mount 20 is installed on the vehicle. Accordingly, the aperture 34 of the elastomeric isolator element 28 defines a hanger axis 36. For example, one end of the hanger 24 may be press fit through the aperture 34 in the elastomeric isolator element 28 to thus be frictionally secured to the elastomeric isolator element 28. Another end of the hanger 24 is secured to the body portion of the vehicle. In this example, the hanger 24 does not form part of the isolator mount 20 itself.

The elastomeric isolator element 28 may be made of any suitable elastomeric material, including without limitation, rubber. The elastomeric isolator element 28 vibrationally decouples the clevis and isolator brackets 32, 30 from the hanger 24 and therefore dampens vibrations that the exhaust component 22 would otherwise transmit to the body portion of the vehicle and vice versa. The isolator bracket 30 extends at least partially about and supports the elastomeric isolator element 28. In the illustrated embodiment, the isolator bracket 30 also includes a neck portion 38 and a hoop portion 40 that extends from the neck portion 38 and circumscribes the elastomeric isolator element 28.

Although other configurations are possible, the elastomeric isolator element 28 may be press fit into the hoop portion 40 of the isolator bracket 30 to provide frictional attachment between the elastomeric isolator element 28 and the isolator bracket 30. The neck portion 38 of the isolator bracket 30 may be integrally formed with the hoop portion 40 so that the isolator bracket 30 forms a single piece component. Alternatively, the hoop portion 40 and the neck portion 38 of the isolator bracket 30 could be formed as separate components and secured together via fasteners or other forms of attachment. In this example, the neck portion 38 of the isolator bracket 30 has a square shape and is telescopically engaged (i.e., a "tube-to-socket" connection) with an open top 42 of the clevis bracket 32.

Both the neck portion 38 and the hoop portion 40 of the isolator bracket 30 may optionally include one or more channels 44 (FIGS. 7-10) to remove weight, promote air circulation, and/or reduce the heat conduction path through the isolator mount 20 to aid in dissipating heat. While the neck portion 38 of the isolator bracket 30 is shown as having a square cross-sectional shape, it should be appreciated that other cross-sectional shapes such as circular, rectangular, etc. could be used as well. The specific cross-sectional shape and dimensions of the open top 42 of the clevis bracket 32 is dictated by the cross-sectional shape and dimensions of the neck portion 38 of the isolator bracket 30 and vice versa. The clevis bracket 32 in one example is formed from stainless steel, while the isolator bracket 30 may be formed from stainless steel, low carbon steel, or another metal such as aluminum. Aluminum is preferable from a weight standpoint. However, if an aluminum isolator bracket 30 is coupled to a stainless steel clevis bracket 32, then to avoid galvanic concerns, it is preferred that either the aluminum isolator bracket 30 be electrically coated, or that the stainless steel mounting bracket be black painted after welding, as is common on muffler black-outing.

The slip fit, telescopic attachment (i.e., "tube-to-socket" connection) of the neck portion 38 of the isolator bracket 30 with the open top 42 of the clevis bracket 32 provides significant added structural strength and rigidity, as well as largely eliminating any issues that might arise with mismatched thermal growth between the isolator bracket 30 and the clevis bracket 32. The slip fit connection between the isolator bracket 30 and the clevis bracket 32 also facilitates improved serviceably because the isolator bracket 30 can be unbolted from the clevis bracket 32 while providing excellent modal stiffness and strength. Although it is anticipated that in most applications, a degree of adjustability will not be needed or desired, the tolerances between the open top 42 of the clevis bracket 32 and the neck portion 38 of the isolator bracket 30 may be selected to provide a small degree of angular adjustability. If no angular adjustability is desired, then tolerances between the open top 42 of the clevis bracket 32 and the neck portion 38 of the isolator bracket 30 may be selected to allow insertion of the neck portion 38 into the open top 42, but with virtually no angular play between the isolator bracket 30 and the clevis bracket 32.

The contact area between the clevis bracket 32 and the exhaust component 22 also forms a longer conduction path to better dissipate the heat from the exhaust component 22, which in turn reduces the heat that reaches the isolator bracket 30, and thus the heat that reaches the elastomeric isolator element 28. This helps to prolong the life of the elastomeric isolator element 28. The hoop portion 40 of the isolator bracket 30 provides the benefit of also helping to dissipate heat from the exhaust component 22 to the ambient environment. This can also help improve the longevity of the elastomeric isolator element 28. And while the hoop portion 40 of the isolator bracket 30 is shown with a circular shape, it will be appreciated that the shape selected for the elastomeric isolator element 28 will largely dictate the shape of the hoop portion 40 of the isolator bracket 30 and vice versa.

As shown in FIGS. 3-6, the clevis bracket 32 includes a first half 46 and a second half 48 that are secured to the neck portion 38 of the isolator bracket 30 with a fastener 50. It should be appreciated that the first half 46 and the second half 48 of the clevis bracket 32 do not have to be the exact same size and shape and therefore do not necessarily form equal halves of the clevis bracket 32. The fastener 50 extends along a longitudinal axis 52. Although other configurations are possible, in the illustrated embodiment, the fastener 50 is a bolt and the longitudinal axis 52 of the fastener 50 is transverse to the exhaust flow axis 26 and the hanger axis 36. The transverse orientation of the hanger axis 36 and the longitudinal axis 52 of the fastener 50 optimizes support to handle the radial loading experienced by the elastomeric isolator element 28. The fastener 50 shown in the Figures includes a head portion 54 that defines a clamping surface 56 and a threaded shank 58 that threadably engages a nut 60 adjacent to the second half 48 of the isolator bracket 30. The nut 60 may optionally be a clinch nut, a nut welded to the second half 48 of the clevis bracket 32, or an independent component (i.e., loose nut) that is held stationary with a suitable tool while the fastener 50 is being tightened. Optionally, the single fastener 50 shown in the Figures may be replaced with two or more fasteners arranged either parallel to or perpendicular to each other, or perpendicular or parallel to the hanger axis 36, depending on the needs of a specific application.

The second half 48 of the clevis bracket 32 includes a bore 62 through which the fastener 50 extends and the neck portion 38 of the isolator bracket 30 includes a passageway 64 that receives the fastener 50. The passageway 64 in the neck portion 38 of the isolator bracket 30 is aligned with the bore 62 in the second half 48 of the clevis bracket 32.

Although the passageway 64 may have a circular cross-section, in the illustrated embodiment, the passageway 64 has a slot-like cross-section that is elongated in a direction perpendicular to the longitudinal axis 52 of the fastener 50 such that the isolator bracket 30 is permitted to slide relative to the fastener 50 a limited distance and move telescopically relative to the clevis bracket 32. In an alternative embodiment, the bore 62 in the second half 48 of the clevis bracket 32 may be threaded to engage the threaded shank 58 of the fastener 50. In accordance with this alternative embodiment, the nut 60 may be eliminated.

The first half 46 of the clevis bracket 32 has a first transverse wall 66, a first longitudinal wall 68, and a second longitudinal wall 70. The fastener 50 extends through the first transverse wall 66 of the first half 46 of the clevis bracket 32. The first and second longitudinal walls 68, 70 extend inwardly from the first transverse wall 66 of the first half 46 of the clevis bracket 32 towards the second half 48 of the clevis bracket 32. The second half 48 of the clevis bracket 32 has a second transverse wall 72, a third longitudinal wall 74, and a fourth longitudinal wall 76. The fastener 50 extends through the second transverse wall 72 of the second half 48 of the clevis bracket 32. The third and fourth longitudinal walls 74, 76 extend inwardly from the second transverse wall 72 of the second half 48 of the clevis bracket 32 towards the first half 46 of the clevis bracket 32. In the illustrated embodiments, the first longitudinal wall 68 of the first half 46 of the clevis bracket 32 partially overlaps with the third longitudinal wall 74 of the second half 48 of the clevis bracket 32 and the second longitudinal wall 70 of the first half 46 of the clevis bracket 32 partially overlaps with the fourth longitudinal wall 76 of the second half 48 of the clevis bracket 32 such that the first half 46 and the second half 48 of the clevis bracket 32 interlock with one another. Accordingly, the first half 46 and the second half 48 of the clevis bracket 32 cooperate to circumscribe the neck portion 38 of the isolator bracket 30 in a clamshell arrangement.

In the illustrated embodiments, the first transverse wall 66 of the first half 46 of the clevis bracket 32 and the second transverse wall 72 of the second half 48 of the clevis bracket 32 are shaped as an acute isosceles trapezoid and have a lower edge 78, opposite the open top 42 of the clevis bracket 32, that is welded to the exhaust component 22 in a direction that is parallel to the exhaust flow axis 26. Optionally, the lower edge 78 may be bent outwardly at a predetermined radius to provide more surface area for welding. It should be appreciated that other shapes and attachment configurations are possible; however, the configuration shown in the Figures is sturdier than other designs because the contact area (weld area) between the lower edge 78 of the first half 46 and second half 48 of the clevis bracket 32 is maximized.

The first half 46 of the clevis bracket 32 and the neck portion 38 of the isolator bracket 30 include an anti-rotation feature 80 in the form of a key-way slot 82 and a key 84 that is received in the key-way slot 82 to prevent rotation of the isolator bracket 30 relative to the clevis bracket 32 about the longitudinal axis 52 of the fastener 50. The key-way slot 82 is positioned in the first half 46 of the clevis bracket 32 and extends between a closed end 86 and an open end 88. The key-way slot 82 is aligned with the passageway 64 in the neck portion 38 of the isolator bracket 30 and receives the fastener 50 when the isolator mount 20 is assembled. The key 84 extends outwardly from the neck portion 38 of the isolator bracket 30 and is received in the key-way slot 82 in the first half 46 of the clevis bracket 32 to prevent rotation. In the illustrated embodiment, the key 84 is integral with the neck portion 38 of the isolator bracket 30; however, it should be appreciated that the key 84 may alternatively be a separate component that is coupled to the neck portion 38 of the isolator bracket 30.

Figure 10:
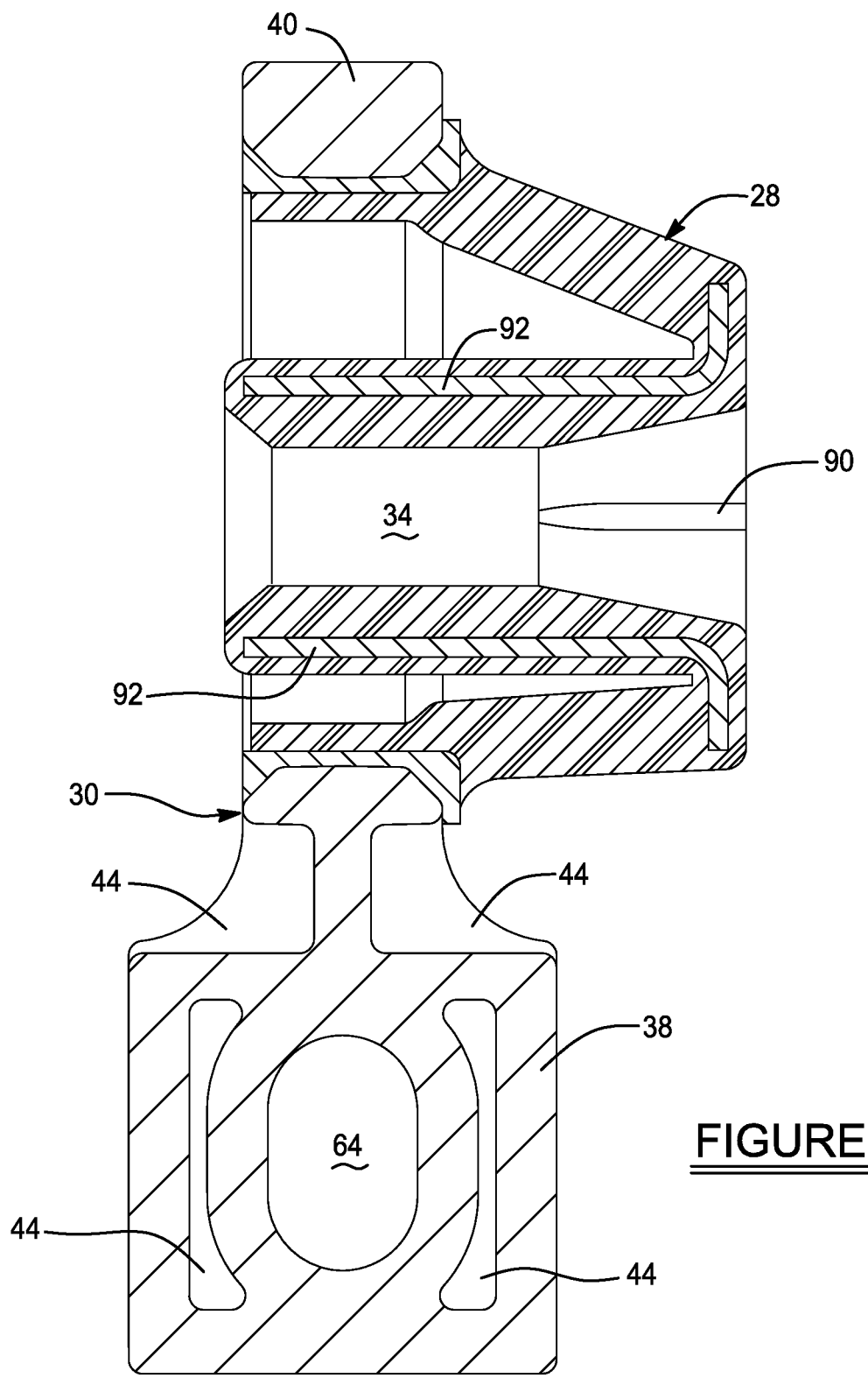
FIG. 10 is a cross sectional view of the isolator bracket and elastomeric isolator element of the exemplary isolator mount illustrated in FIG. 3 taken along section line 10-10 in FIG. 9.
Figure 11:
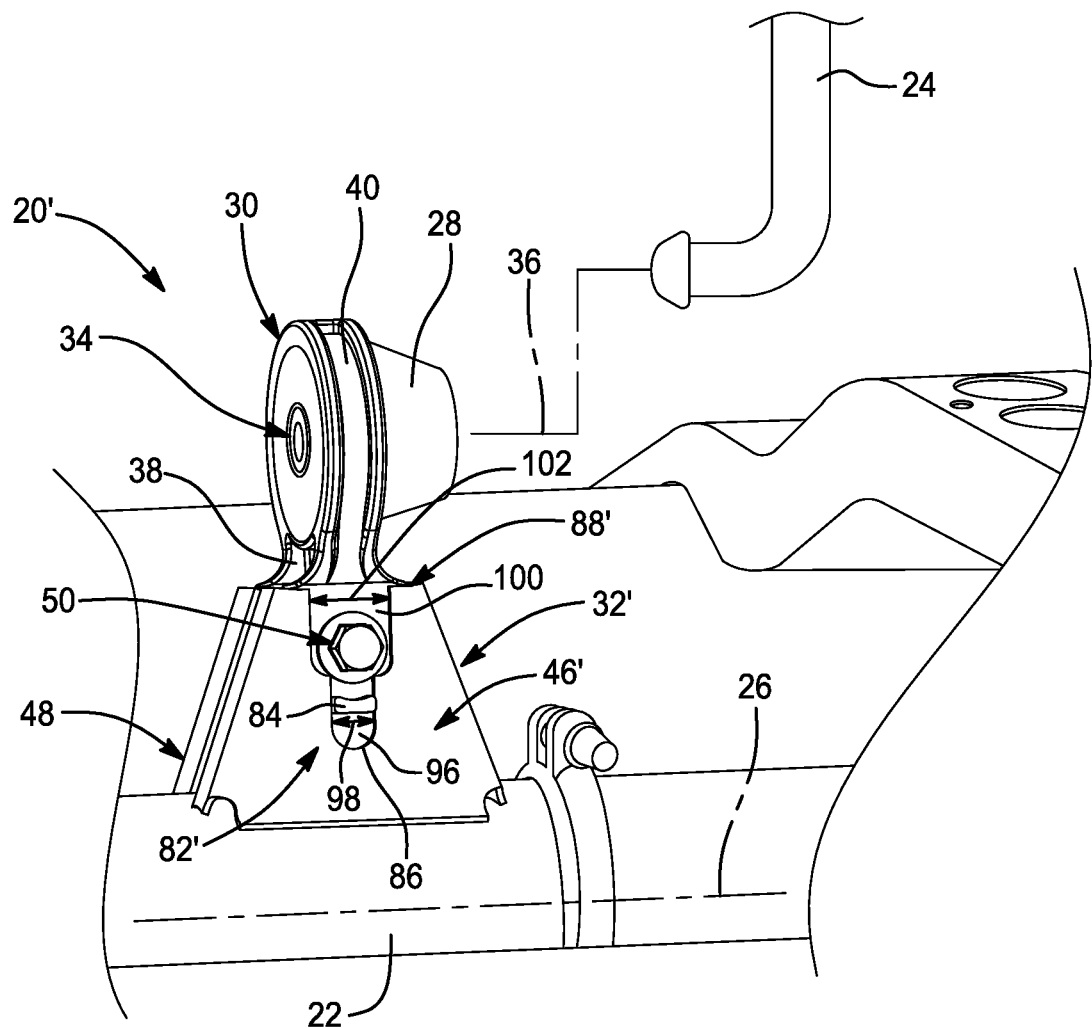
FIG. 11 is a front perspective view of another exemplary isolator mount constructed in accordance with the present disclosure that is shown installed on an exhaust component of a vehicle.
Figure 12:
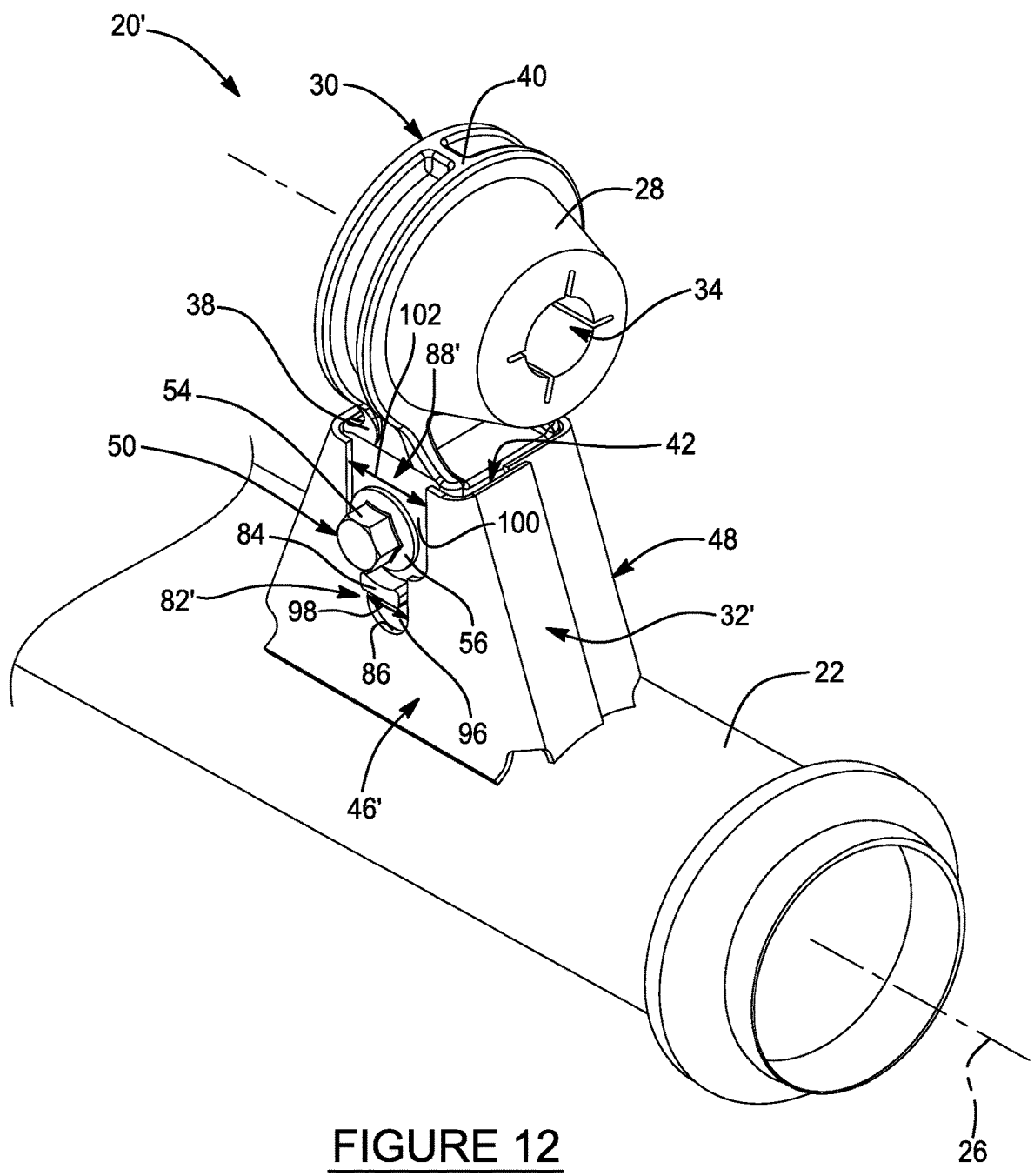
FIG. 12 is an enlarged front perspective view of the exemplary isolator mount illustrated in FIG. 11 with just a portion of the exhaust component being shown.
Figure 13:
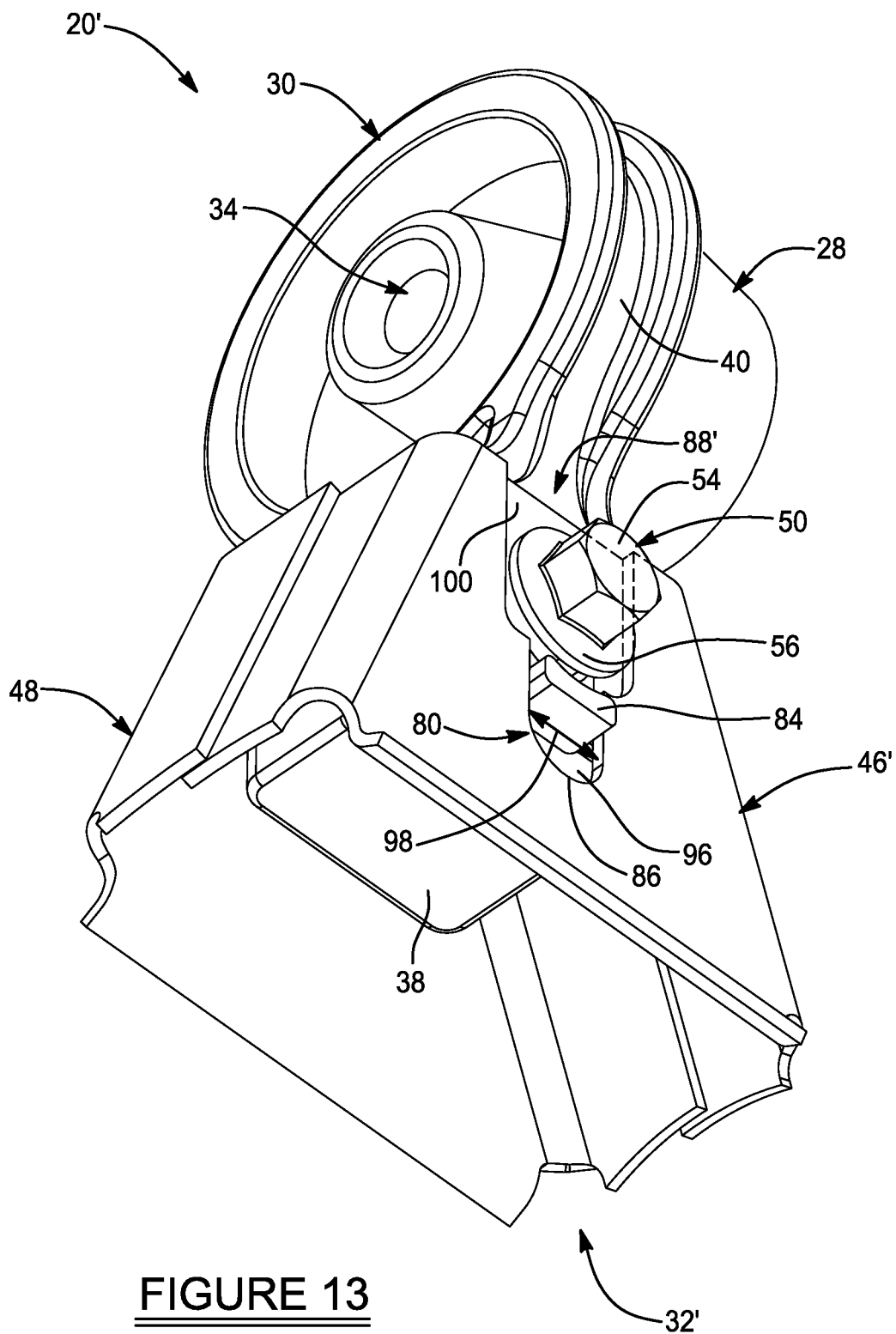
FIG. 13 is a front perspective view of the exemplary isolator mount illustrated in FIG. 11 shown detached from the exhaust component.
Figure 14:
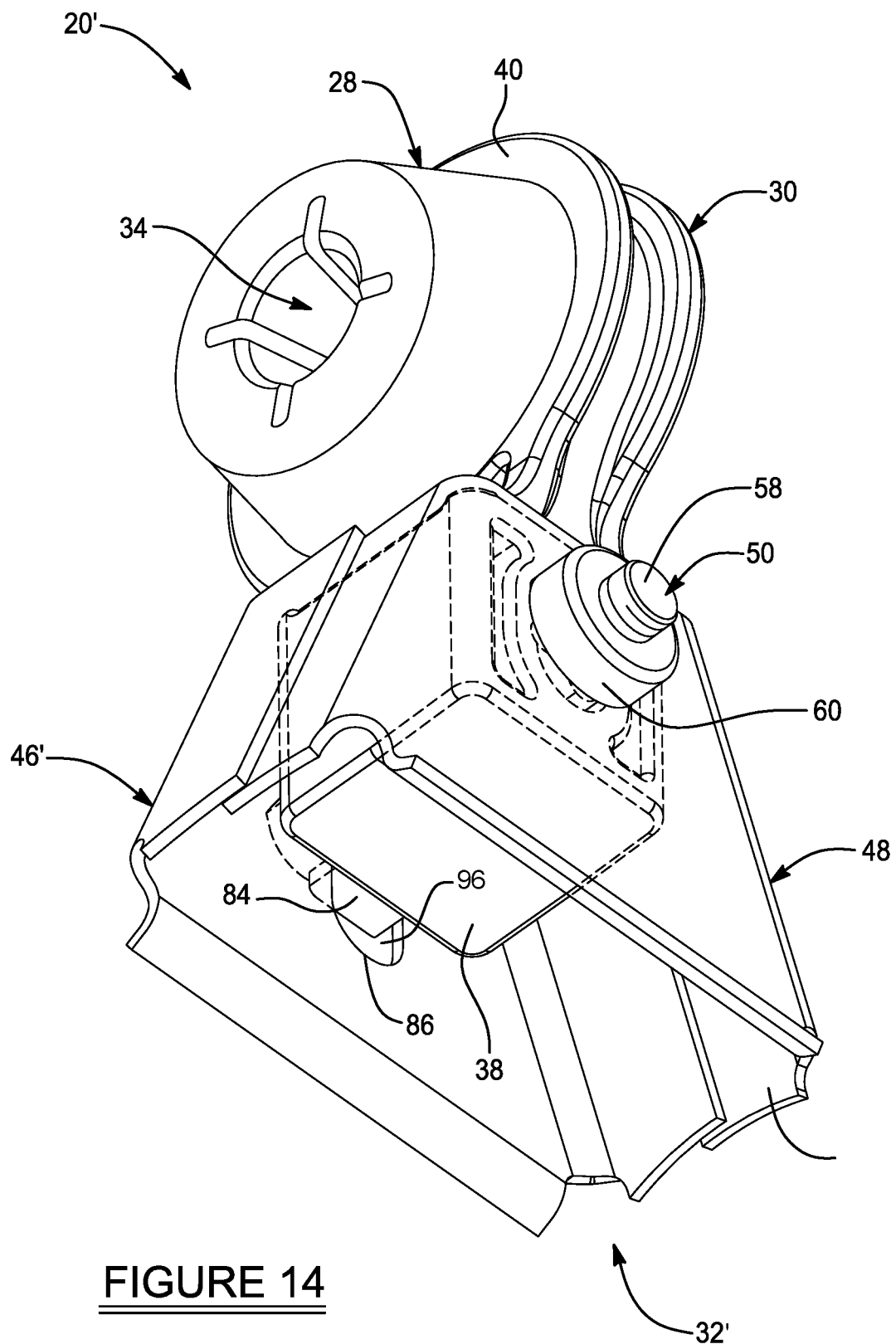
FIG. 14 is a rear perspective view of the exemplary isolator mount illustrated in FIG. 11 shown detached from the exhaust component.

FIGS. 7-10 illustrate just the isolator bracket 30 with the elastomeric isolator element 28 mounted therein. In the illustrated example, the elastomeric isolator element 28 includes a plurality of grooves 90. As shown in FIG. 10, the elastomeric isolator element 28 may also include a flange 92, which fits within the hoop portion 40 of the isolator bracket 30 and helps secure the elastomeric isolator element 28 in the isolator bracket 30 because the flange 92 is stiffer than the material forming the elastomeric isolator element 28. By way of example and without limitation, the flange 92 may be made of metal or plastic and the elastomeric isolator element 28 may be overmolded around the flange 92. The grooves 90 shown in FIG. 10 act as chaplets that hold the flange 92 in place as the elastomeric isolator element 28 is overmolded. In addition, the grooves 90 can aid in easing insertion of an end of the hanger 24 through the elastomeric isolator element 28.

In the embodiment shown in FIGS. 3-10, the key-way slot 82 in the first half 46 of the clevis bracket 32 has a constant width 94 from the open end 88 of the key-way slot 82 to just above the closed end 86 of the key-way slot 82. The clamping surface 56 of the head portion 54 of the fastener 50 is wider than the constant width 94 of the key-way slot 82 such that the clamping surface 56 of the head portion 54 of the fastener 50 bears against the first half 46 of the clevis bracket 32 adjacent to the key-way slot 82 when the fastener 50 is tightened.

In FIGS. 11-14, an isolator mount 20' is shown where the key-way slot 82' in the first half 46' of the clevis bracket 32' has a first segment 96 having a first width 98 and a second segment 100 having a second width 102. The first segment 96 extends from just above the closed end 86 of the key-way slot 82' to the second segment 100 and the second segment 100 extends from the first segment 96 to the open end 88' of the key-way slot 82'. The second width 102 is larger than the first width 98, meaning that the key-way slot 82' has a narrower width segment near the closed end 86 and a wider width segment near the open end 88'. The key 84 extends outwardly from the neck portion 38 of the isolator bracket 30 and is received in the first segment 96 of the key-way slot 82'. Meanwhile, the fastener 50 is received in the second segment 100 of the key-way slot 82' when the isolator mount 20' is assembled. The clamping surface 56 of the head portion 54 of the fastener 50 is narrower than the second width 102 of the second segment 100 of the key-way slot 82' such that the clamping surface 56 of the head portion 54 of the fastener 50 bears against the neck portion 38 of the isolator bracket 30 when the fastener 50 is tightened. In accordance with this embodiment, manufacturing tolerances can be less precise because only the second half 48 of the clevis bracket 32 engages the fastener 50. It should be appreciated that all of the other features of the isolator mount 20' shown in FIGS. 11-14 are the same as the isolator mount 20 shown in FIGS. 3-10 and therefore have the same reference numbers.

Figure 15:
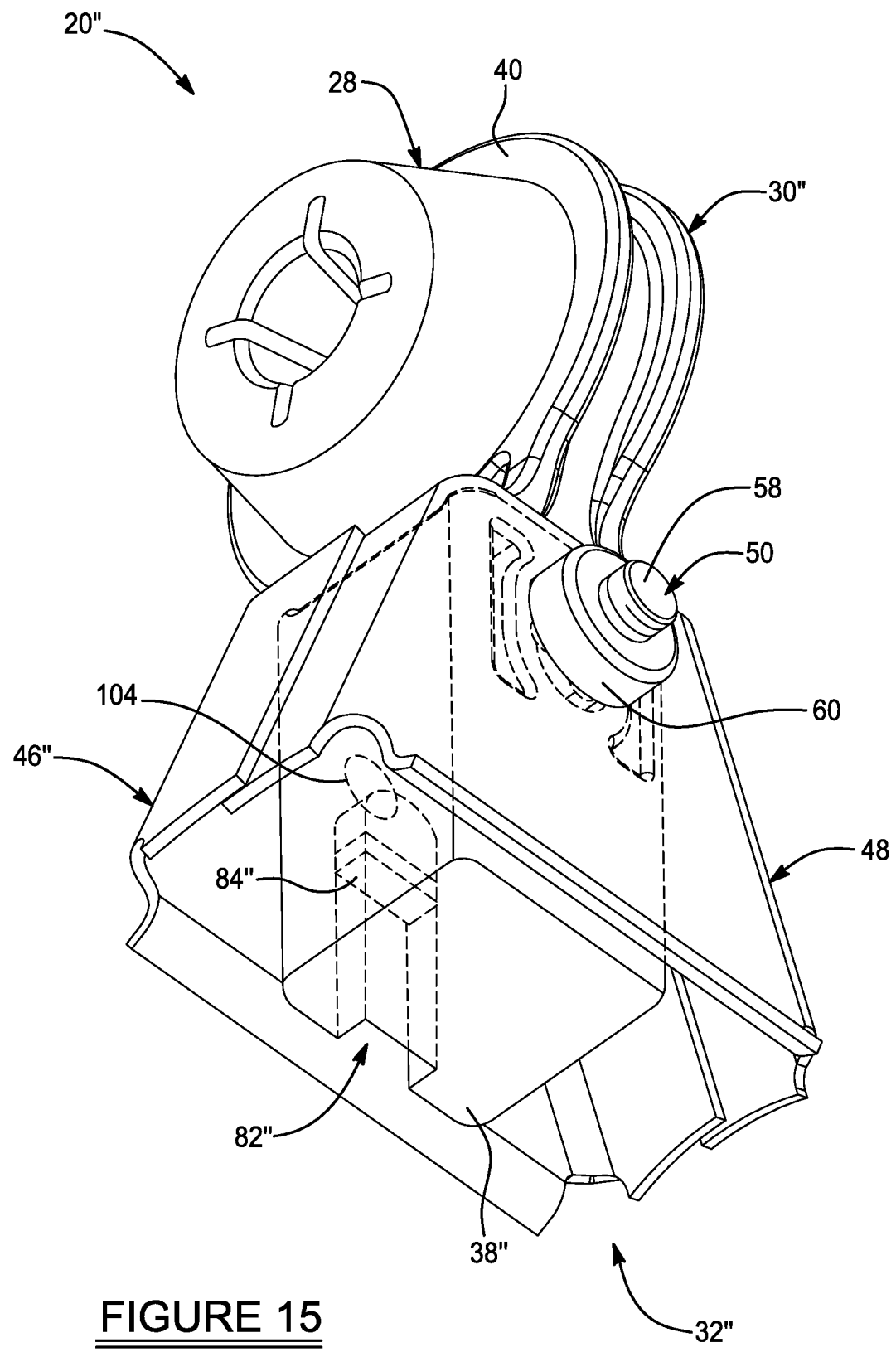
FIG. 15 is a rear perspective view of another exemplary isolator mount constructed in accordance with the present disclosure that is shown detached from the exhaust component.
Figure 16:
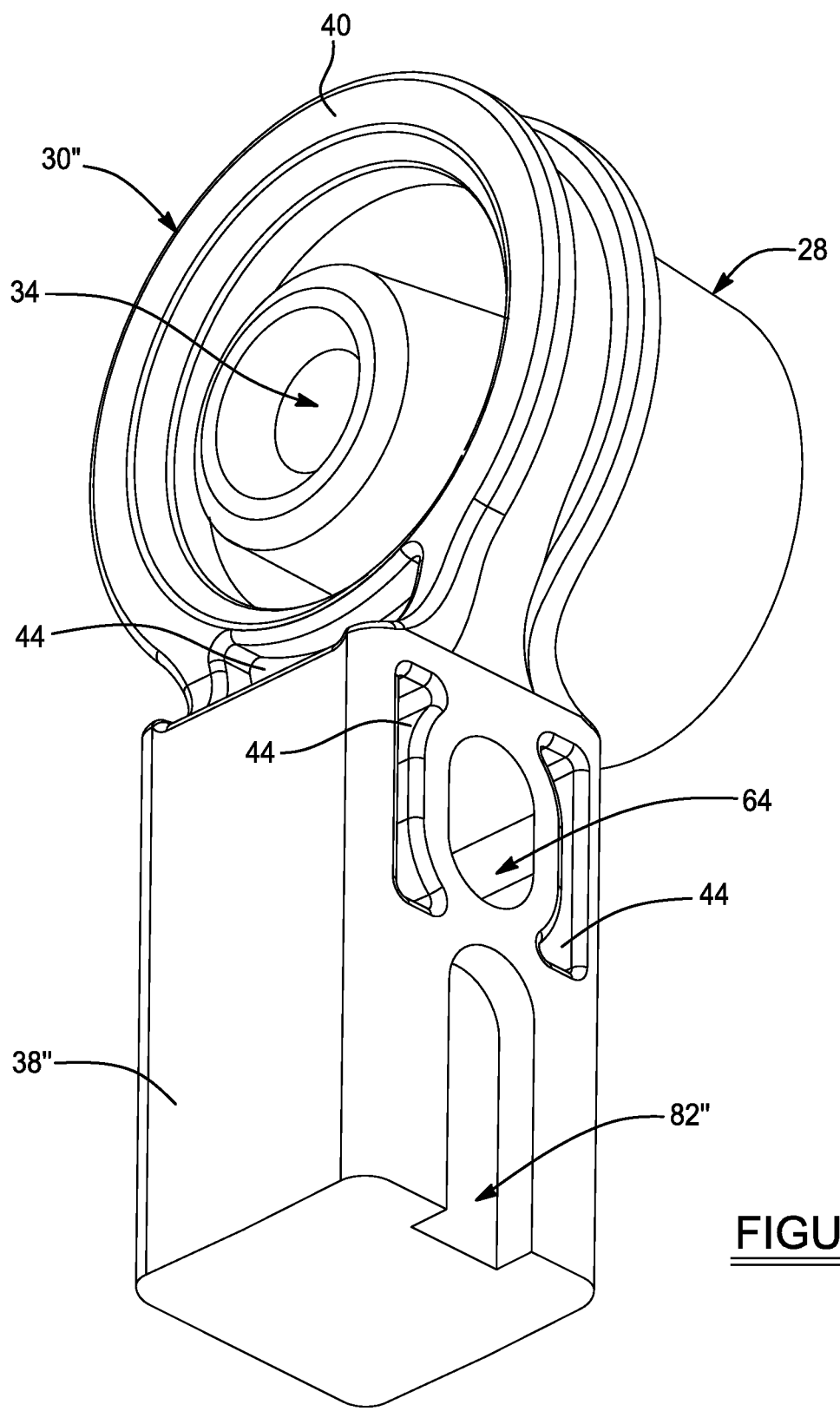
FIG. 16 is a front perspective view of an isolator bracket and an elastomeric isolator element of the exemplary isolator mount illustrated in FIG. 15.

It should be appreciated that arrangements where the key-way slot 82 and the key 84 are reversed are possible. For example, FIGS. 15 and 16 show an isolator mount 20" where the key-way slot 82" is located in the neck portion 38" of the isolator bracket 30" and the key 84" extends inwardly from the first half 46" of the clevis bracket 32" such that the key 84" is received in the key-way slot 82" in the neck portion 38" of the isolator bracket 30" to prevent relative rotation. In accordance with this embodiment, the first half 46" of the clevis bracket 32" includes an opening 104 that is aligned with the passageway 64 in the neck portion 38" of the isolator bracket 30". The fastener 50 extends through this opening 104 when the isolator mount 20" is assembled. It should be appreciated that all of the other features of the isolator mount 20" shown in FIGS. 15 and 16 are the same as the isolator mount 20 shown in FIGS. 3-10 and therefore have the same reference numbers.

The various embodiments disclosed herein all enable an exhaust component 22 to be secured to a body portion of a vehicle using only a single hanger 24 secured to the body portion. The isolator bracket 30, 30" and clevis bracket 32, 32', 32" of the various embodiments all serve to more efficiently conduct and dissipate heat from the exhaust component 22, which can help to prolong the life of the elastomeric isolator element 28. Supporting the elastomeric isolator element 28 from a hoop portion 40 of the isolator bracket 30, 30" provides added stiffness and strength and also helps to dissipate heat before the heat reaches the elastomeric isolator element 28. The various embodiments disclosed herein all provide enhanced serviceability as compared to prior art isolator designs.

While various embodiments have been described, those skilled in the art will recognize modifications or variations which might be made without departing from the present disclosure. The examples illustrate the various embodiments and are not intended to limit the present disclosure. Therefore, the description and claims should be interpreted liberally with only such limitation as is necessary in view of the pertinent prior art.

What is claimed is:

1. An isolator mount for supporting an exhaust component on a body portion of a vehicle via a hanger, the isolator mounting apparatus comprising:
   an elastomeric isolator element having an aperture for receiving a portion of the hanger;
   an isolator bracket extending at least partially about and supporting the elastomeric isolator element, the isolator bracket including a neck portion extending therefrom; and
   a clevis bracket including a first half and a second half, at least one of the first half and the second half of the clevis bracket being secured to the neck portion of the isolator bracket with a fastener extending along a longitudinal axis,
   wherein the first half of the clevis bracket and the neck portion of the isolator bracket include an anti-rotation feature in the form of a key-way slot and a key that is received in the key-way slot to prevent rotation of the isolator bracket relative to the clevis bracket, wherein the second half of the clevis bracket includes a bore through which the fastener extends.

2. The isolator mount as set forth in claim 1, wherein the aperture of the elastomeric isolator element defines a hanger axis, the longitudinal axis and the hanger axis extending perpendicular to each other.

3. The isolator mount as set forth in claim 1, wherein the neck portion of the isolator bracket includes a passageway that receives the fastener, the passageway being aligned with the bore in the second half of the clevis bracket.

4. The isolator mount as set forth in claim 3, wherein the key-way slot is positioned in the first half of the clevis bracket, wherein the key-way slot is aligned with the passageway in the neck portion of the isolator bracket and receives the fastener, and wherein the key extends outwardly from the neck portion of the isolator bracket and is received in the key-way slot in the first half of the clevis bracket to prevent rotation.

5. The isolator mount as set forth in claim 4, wherein the key-way slot in the first half of the clevis bracket has a constant width and wherein the fastener includes a clamping surface that is wider than the constant width of the key-way slot such that the clamping surface of the fastener bears against the first half of the clevis bracket adjacent to the key-way slot when the fastener is tightened.

6. The isolator mount as set forth in claim 4, wherein the key-way slot in the first half of the clevis bracket has a first segment having a first width and a second segment having a second width that is larger than the first width, wherein the key is received in the first segment of the key-way slot and the fastener is received in the second segment of the key-way slot, and wherein the fastener includes a clamping surface that is narrower than the second width of the second segment of the key-way slot such that the clamping surface of the fastener bears against the neck portion of the isolator bracket when the fastener is tightened.

7. The isolator mount as set forth in claim 3, wherein the key-way slot is positioned in the neck portion of the isolator bracket, wherein the first half of the clevis bracket includes an opening that is aligned with the passageway in the neck portion of the isolator bracket and that receives the fastener, and wherein the key extends inwardly from the first half of the clevis bracket and is received in the key-way slot in the neck portion of the isolator bracket to prevent rotation.

8. The isolator mount as set forth in claim 3, wherein the passageway has a cross-section that is elongated in a direction perpendicular to the longitudinal axis of the fastener such that the isolator bracket is permitted to slide relative to the fastener a limited distance and move telescopically relative to the clevis bracket.

9. The isolator mount as set forth in claim 1, wherein the fastener includes a threaded shank that threadably engages a nut adjacent to the second half of the clevis bracket.

10. The isolator mount as set forth in claim 1, wherein the isolator bracket includes a hoop portion that extends from the neck portion and that circumscribes the elastomeric clevis element.

11. An isolator mount for supporting an exhaust component on a body portion of a vehicle via a hanger, the isolator mounting apparatus comprising:
    an elastomeric isolator element having an aperture for receiving a portion of the hanger;
    an isolator bracket extending at least partially about and supporting the elastomeric isolator element, the isolator bracket including a neck portion extending therefrom; and
    a clevis bracket including a first half and a second half, at least one of the first half and the second half of the clevis bracket being secured to the neck portion of the isolator bracket with a fastener extending along a longitudinal axis,
    wherein the first half of the clevis bracket and the neck portion of the isolator bracket include an anti-rotation feature in the form of a key-way slot and a key that is received in the key-way slot to prevent rotation of the isolator bracket relative to the clevis bracket, wherein the first half of the clevis bracket has a first transverse wall through which the fastener extends and first and second longitudinal walls that extend from the first transverse wall towards the second half of the clevis bracket and wherein the second half of the clevis bracket has a second transverse wall through which the fastener extends and third and fourth longitudinal walls that extend from the second transverse wall towards the first half of the clevis bracket.

12. The isolator mount as set forth in claim 11, wherein the first longitudinal wall of the first half of the clevis bracket at least partially overlaps with the third longitudinal wall of the second half of the clevis bracket and the second longitudinal wall of the first half of the clevis bracket at least partially overlaps with the fourth longitudinal wall of the second half of the clevis bracket such that the first half and the second half of the clevis bracket cooperate to circumscribe the neck portion of the isolator bracket in a clamshell arrangement.

13. The isolator mount as set forth in claim 11, wherein the exhaust component is adapted to carry exhaust along an exhaust flow axis, the exhaust flow axis extending perpendicular to the longitudinal axis.

14. The isolator mount as set forth in claim 13, wherein the first transverse wall of the first half of the clevis bracket and the second transverse wall of the second half of the clevis bracket are shaped as an acute isosceles trapezoid and have a lower edge that is configured to be welded to the exhaust component in a direction that is parallel to the exhaust flow axis.

15. An isolator mount for supporting an exhaust component on a body portion of a vehicle, the isolator mounting apparatus comprising:
    an isolator bracket including a neck portion extending therefrom; and
    a clevis bracket including a first half and a second half, at least one of the first half and the second half of the clevis bracket being secured to the neck portion of the isolator bracket with a fastener extending along a longitudinal axis,
    wherein the first half of the clevis bracket and the neck portion of the isolator bracket include an anti-rotation feature in the form of a key-way slot and a key that is received in the key-way slot to prevent rotation of the isolator bracket relative to the clevis bracket about the longitudinal axis of the fastener, the first half of the clevis bracket partially overlapping the second half of the clevis bracket.

16. The isolator mount as set forth in claim 15, wherein the key-way slot is positioned in the first half of the clevis bracket and receives the fastener and wherein the key extends outwardly from the neck portion of the isolator bracket and is received in the key-way slot in the first half of the clevis bracket to prevent rotation.

17. The isolator mount as set forth in claim 15, wherein the neck portion of the isolator bracket includes a passageway that receives the fastener, the passageway having a cross-section that is elongated in a direction perpendicular to the longitudinal axis of the fastener such that the isolator bracket is permitted to slide relative to the fastener a limited distance and move telescopically relative to the clevis bracket.

18. An isolator mount for supporting an exhaust component on a body portion of a vehicle, the isolator mounting apparatus comprising:
    an isolator bracket including a neck portion extending therefrom; and
    a clevis bracket including a first half and a second half, at least one of the first half and the second half of the clevis bracket being secured to the neck portion of the isolator bracket with a fastener extending along a longitudinal axis,
    wherein the first half of the clevis bracket and the neck portion of the isolator bracket include an anti-rotation feature in the form of a key-way slot and a key that is received in the key-way slot to prevent rotation of the isolator bracket relative to the clevis bracket about the longitudinal axis of the fastener, wherein the key-way slot is positioned in the neck portion of the isolator bracket and wherein the key extends inwardly from the first half of the clevis bracket and is received in the key-way slot in the neck portion of the isolator bracket to prevent rotation.

19. An isolator mount for supporting an exhaust component on a body portion of a vehicle via a hanger, the isolator mounting apparatus comprising:
    an isolator bracket including a neck portion and a hoop portion extending from the neck portion;
    an isolator element mounted in the hoop portion of the isolator bracket, the isolator element having at least one aperture for receiving a portion of the hanger and being made of a material that dampens vibrations between the hanger and the isolator bracket; and
    a clevis bracket including a first half and a second half, at least one of the first half and the second half of the clevis bracket being secured to the neck portion of the isolator bracket with a fastener extending along a longitudinal axis,
    wherein the first half of the clevis bracket and the neck portion of the isolator bracket include an anti-rotation feature in the form of a key-way slot and a key that is received in the key-way slot to prevent rotation of the isolator bracket relative to the clevis bracket about the longitudinal axis of the fastener, wherein the neck portion of the isolator bracket includes an elongated passageway in receipt of the fastener such that the isolator bracket is permitted to slide relative to the fastener a limited distance and move telescopically relative to the clevis bracket.

* * * * *